United States Patent [19]
Tejeda

[11] 3,869,382
[45] Mar. 4, 1975

[54] METHOD AND APPARATUS FOR DETERMINING EXHAUSTION OF A MASS OF ION EXCHANGE MATERIAL AND A DEVICE USING THE SAME

[75] Inventor: Alvaro R. Tejeda, New York, N.Y.

[73] Assignee: J. Vast Associates, Inc., New York, N.Y.

[22] Filed: Jan. 3, 1974

[21] Appl. No.: 430,464

[52] U.S. Cl.................. 210/30, 210/25, 210/85, 210/96
[51] Int. Cl............................................ B01d 15/04
[58] Field of Search............ 210/24, 25, 30, 85, 87, 210/96

[56] References Cited
UNITED STATES PATENTS

| | | | |
|---|---|---|---|
| 3,172,037 | 3/1963 | Pfeiffer | 210/85 X |
| 3,245,537 | 4/1966 | Burgess | 210/85 |
| 3,618,769 | 11/1971 | Igleslas | 210/85 |

Primary Examiner—John Adee
Attorney, Agent, or Firm—Kirschstein, Kirschstein, Ottinger

[57] ABSTRACT

Equipment and process for treating water with a bed of ion exchange material in which exhaustion of the bed is determined by measuring an internally generated potential which markedly changes as exhaustion is approached. The potential is measured between two points having at least a portion of the material disposed therebetween, one of the points being adjacent the discharge end of the bed and the other being upstream thereof. In a preferred form of the invention the bed is in a household device that softens water flowing from a faucet.

32 Claims, 6 Drawing Figures

PATENTED MAR 4 1975 3,869,382

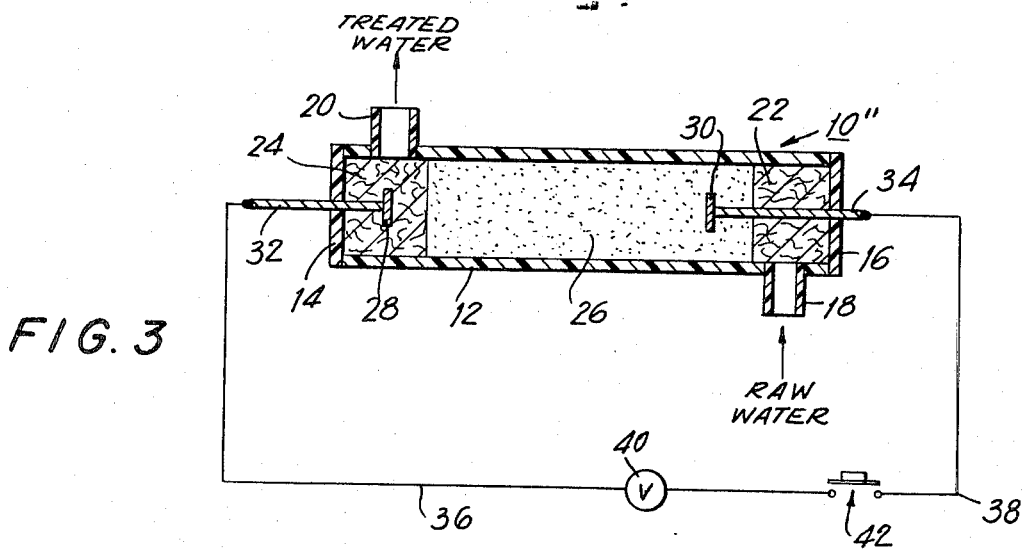
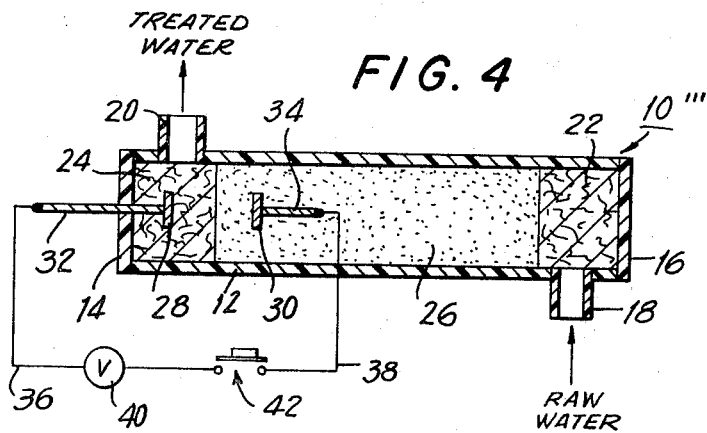
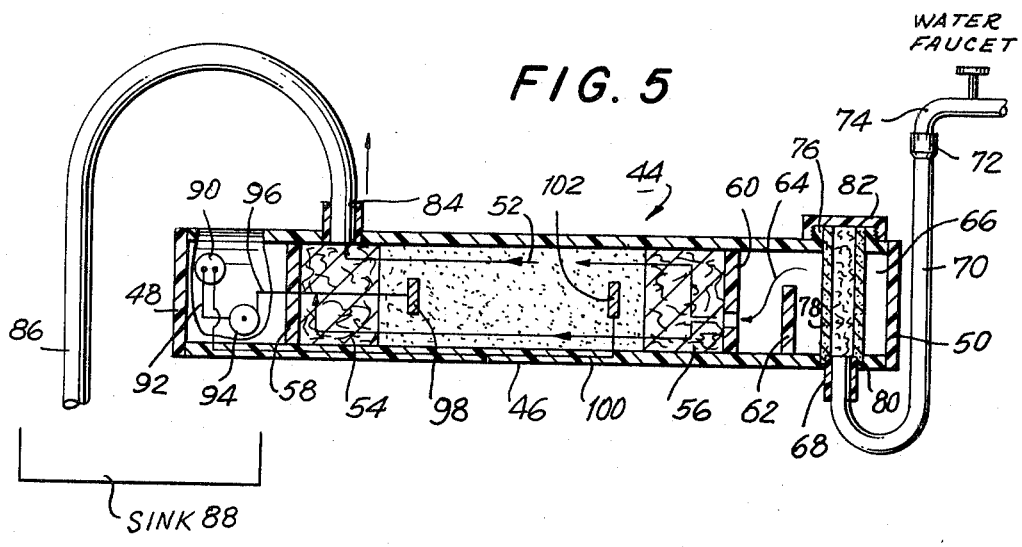

ns,869,382

METHOD AND APPARATUS FOR DETERMINING EXHAUSTION OF A MASS OF ION EXCHANGE MATERIAL AND A DEVICE USING THE SAME

BACKGROUND OF THE INVENTION

1. Field of the Invention

A system for determining exhaustion of a bed of ion exchange material, and household water softening equipment utilizing the same.

2. Description of the Prior Art

In an ion exchange system a bed, soemtimes called a column, of ion exchange material, usually an ion exchange resin, is provided through which water flows for treatment purposes. The treatment can be any of various types. For instance, if the ion exchange material operates on a sodium cycle, water passing through it will be softened by the substitution of sodium ions from the material for various other cations present in the entering water. If the ion exchange material operates on a hydrogen cycle, hydrogen ions from the material will be substituted for the cations in the entering water, so tht the effluent will be decationized. If the ion exchange material operates on a chloride cycle, the effluent water will be dealkalized, chloride ions from the material being substituted for various anions in the water being treated. If the ion exchange material operates on a hydroxy cycle, the effluent water will be deanionized. Furthermore, it is well-known in the art to employ a "mixed" bed which includes a mixture of two types of ion exchange material, one being charged with hydrogen ions and the other being charged with hydroxy ions; in this case the effluent is a deionized water, also known as a demineralized water.

In all of these ion exchange systems the ion exchange material which at the start is charged in a certain fashion as with sodium or hydrogen or chloride or hydroxy ions characteristically experiences a change, there being substituted for the ions on the resin materials the cations and/or anions in the entering water, which it is desired to remove. Eventually, when the substitution is substantially complete, the bed no longer will function for tis intended purpose. When this state is reached, the bed is "exhausted" and must be regenerated or replaced if it is to be used again.

Suitable equipment must be employed to determine when a bed is exhausted. Heretofore, it has been customary to use for this purpose a rather elaborate piece of apparatus known as a "conductivity cell". It constituted a pair of electrodes located either in the effluent from the ion exchange material or in the ion exchannge material near the discharge end of the bed. The pair of electrodes constituted one leg of a Wheatstone bridge. A voltage was applied to a pair of opposed junctions of the bridge and a meter was connected between the remaining pair of junctions. When the meter was balanced, substantially no current flowed through the leg that included the pair of electrodes. The absence of current flow at the time of measurement was quite important because a current flow between the electrodes through the electrolyte caused polarization if the current was DC. If it was AC rather high voltage was used which in the presence of water raised the danger of an electric shock and prevented such cells from being used in homes. Moreover, the prices of conductivity cells and of supporting equipment was so high as to make a conductivity cell impractical for home use.

To overcome these problems it has been the practice, when using ion exchange materials for laboratory purposes and for home systems, to employ a different arrangement. This included a time device that functioned on the basis that after a certain amount of use, which essentially was function of time, exhaustion would be reached. The timing device was used with a piping system and several control valves to bypass the ion exchange bed, to charge a regenerating solution into the ion exchange bed, to permit the effluent from the ion exchange bed to flow to waste during regeneration and to set up a backwash cycle. The cost and expense of the timing device, piping systems and valves inhibited their use except where price was not a deterrent and except where peculiarly bad circumstances existed, as for example, a source of exceptionally hard water.

There also has been proposed, particularly for laboratory use, a disposable cartridge having a mixed-bed of ion exchange resins. This too utilized a conductivity cell.

Mention has been made of the fact that there are available ion exchange material devices which are used to soften water in the home. However, these are employed to soften all the water that is supplied, including kitchen sinks, lavatories, bathtubs, showers, toilets, etc. But there is not commercially available any simple device which can be attached to a faucet or the like to soften tap water from a single outlet. The need for this is quite apparent because it is not necessary to soften water throughout an entire house. Usually, water only has to be softened at one or a few points of a house, for example, at the kitchen sink, at a clothes-washing machine and at a lavatory sink where hair on the human head is to be washed as well as the hands and face. It therefore would be quite desirable to provide an inexpensive simple compact single-tap water-softener. The only type of water-treating equipment of which the inventor is aware, and which is useful for individual taps, is a filter cartridge, containing one or both of two types of filtering material. One is a batt of fibers. The other is a mass of activated charcoal. The fiber batt is employed to remove particulate material present in the water. The activated charcoal mass is employed to remove odors from the water. Of course, neither one of these will remove dissolved material, such, for instance as iron salts and salts which create hard water.

SUMMARY OF THE INVENTION

1. Purposes of the Invention

It is an object of the invention to provide an improved device for determining exhaustion or approach to exhaustion, which terms hereinafter will be used interchangeably, of a mass of ion exchange material.

It is another object of the invention to provide a device of the character described which will operate without an external source of electricity, such, for instance, as a local AC power supply or batteries, but which functions by internal electrochemical generation of a potential that changes upon approach to exhaustion of the ion exchange material.

It is another object of the invention to provide a device of the character described which constitutes relatively few and simple parts and can be manufactured by mass-production methods at an extremely low cost.

It is another object of the invention to provide a device of the character described which includes no moving parts except for equipment responsive to a change of potential.

It is another object of the invention to provide a device of the character described which requires no elements external to the ion exchange bed except for potential responsive equipment and a push button.

It is another object of the invention to provide a device of the character described which is so simple in operation that it requires essentially no explanation to even the most obtuse persons.

It is another object of the invention to provide a device of the character described which generates extremely low potentials and currents in its operation so that there is no danger, regardless of how the device is handled, of engendering a noticeable electric shock.

It is another object of the invention to provide, in conjunction with a device of the character described, a simple water-softener, which can be employed with an individual water outlet in a home, the softener being of such construction that the ion exchange material is easily regeneratable by a housewife when the device indicates exhaustion.

It is another object of the invention to provide a softener of the character described which can be regenerated easily by a housewife with common table salt.

It is another object of the invention to provide a softener of the character described which is quite compact and can be oriented horizontally so that it can be located readily above a faucet against a wall in an out-of-the-way position.

It is another object of the invention to provide a softener of the character described which can be made at a low cost, is rugged and durable and is highly efficient in operation.

It is another object of the invention to provide a softener of the character described which requires negligible maintenance and has an exceedingly low operational cost, the same being only the price of the table salt employed from time to time for regeneration.

It is another object of the invention to provide a softener of the character described which does not require external plumbing or valving.

It is another object of the invention to provide a softener of the character described which has associated therewith a conventional filter that either removes particulate matter, or odors, or both.

It is another object of the invention to provide a softener of the character described which does not require periodic substitution of a disposable cartridge.

Other objects of the invention in part will be obvious and in part will be pointed out hereinafter.

2. Brief Description of the Invention

The system for determining exhaustion of a bed of ion exchange material constitutes a pair of electrodes spaced apart in the direction of flow of water through the system and having at least a portion of the bed therebetween. In the preferred form of the invention the electrodes are widely spaced apart in said direction of flow, both being located within the ion exchange material adjacent opposite ends thereof.

The ion exchange material can be a cation exchange material or an anion exchange material or a mixed bed. In the event that a cation exchange material is employed, preferably it is charged with either sodium ions or hydrogen ions in its original state, and if an anion material is employed it is charged with either chloride or hydroxy ions in its original state. If the ion exchange material constitutes a mixed bed, including a homogeneous mass of both cation and anion exchange materials, the cation exchange material is charged with hydrogen in its original state and the anion exchange material is charged with hydroxy ions in its original state.

In the most desirable form of the invention which will be described shortly hereinafter, the device operates as a softener and the ion exchange material therefore constitutes a cation exchange material on the sodium cycle. This material will operate to remove from the water flowing through it undesirable cations, such, for instance, as calcium, magnesium, and iron, and to substitute sodium for the same in the effluent water. The ion exchange material is in the form of a column which may be oriented as desired, for example, vertically or horizontally, the latter being the most desirable for household use.

It is known that when water to be treated is introduced at one end of such a column, the exchange material experiences a conversion from the original ion-charged state to a second state in which the originally charged ions on the material have had the undesirable ions substituted therefor. This transformation takes place over a moving boundary to one side of which the exchange (substitution) of the undesirable ions is complete, and to the other side of which the material still is in the original state. The boundary has a finite thickness within which there is a gradual conversion from the original state to the substituted state. This boundary gradually moves from the water entrance end of the exchange column toward the discharge end of said column. When the boundary reaches the discharge end the ion exchange material is considered to be exhausted; it is time for regeneration.

It has been discovered that if a pair of electrodes is located in the flow path at positions spaced in the direction of flow and with at least a portion of the material interposed between the electrodes, a potential is electrochemically generated. A potential is present between the electrodes after operation of the column has started. This potential experiences a rather marked change when the portion of the column between the electrodes changes from its original state to its substituted state. The change in potential may constitute an increase or a decrease depending upon the specific location of the electrodes and the ion exchange system employed.

The aforesaid potential is applied to an instrument, preferably of a simple and inexpensive nature, responsive either to the voltage or the current generated. In a highly practical commercial application of the aforesaid device, it is employed with a home water softener, such as is intended to be used with a single water outlet, for instance a tap. Such a softener which has not heretofore been marketed constitutes a horizontal elongated vessel provided with a pair of spaced retaining partitions between which there is disposed a bed of cation exchange material that is on a sodium cycle in its original state. Desirably, there is interposed between each partition and the adjacent face of the bed a permeable member which prevents loss of ion exchange material as water flows through the vessel. At the entrance side of the inlet partition, a baffle is disposed, which will keep the water at a high level within the bed. On the side of the baffle remote from the bed is a inlet chamber which desirably contains a removable filter. Any one of three kinds of filters can be employed. One constitutes material for filtering out particulate matter, for instance, a batt of randomly located filaments. Another type of filter constitutes activated charcoal. A further type of filter is a combination of the first two. Preferably, the water inlet is at a low level in the inlet chamber and the outlet is at a high level in the vessel. The filter desirably is in the form of a removable cartridge which can be replaced for regeneration with salt.

BRIEF DESCRIPTION OF THE DRAWINGS

In the accompanying drawings in which are shown various possible embodiments of the invention:

FIGS. 2 – 4 are views similar to FIG. 1 of devices incorporating other forms of exhaustion manifesting means embodying the invention; and FIG. 5 is a longitudinal central sectional view of a water purifer/softener including an aforesaid exhaustion manifesting means.

PREFERRED EMBODIMENTS OF THE INVENTION

Figure 1:
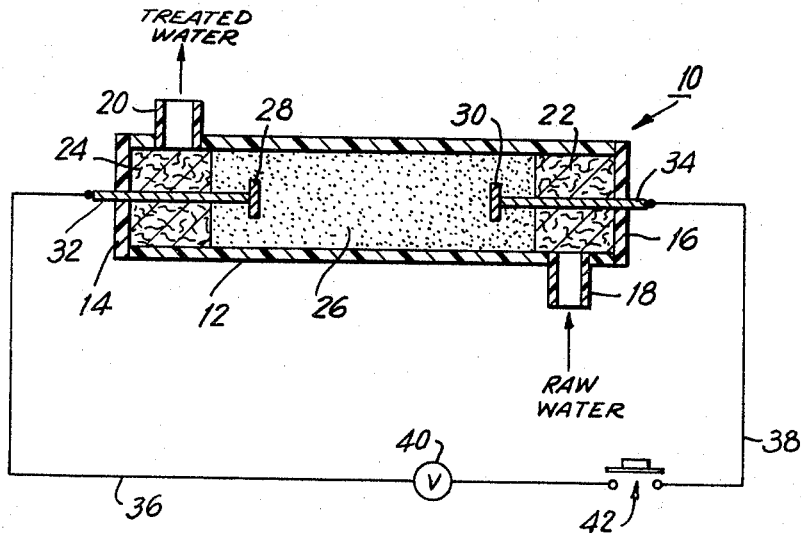
FIG. 1 is a sectional view of an ion exchange device including one form of means according to the present invention of manifesting exhaustion of the ion exchange bed.
Figure 1A:
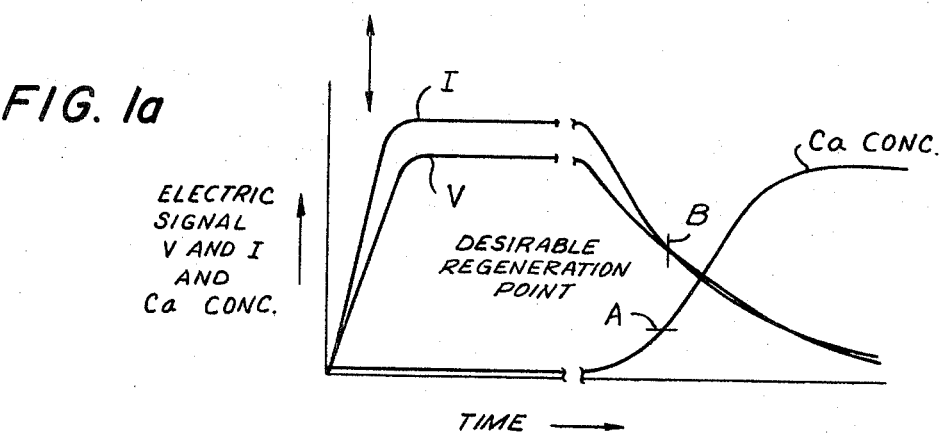
FIG. 1a is a graph illustrating the operation of the exhaustion manifesting means.

Referring now in detail to the drawings, and more particularly to FIGS. 1 and 1a, the reference numeral 10 denotes a device embodying the invention. Said device includes a water-impermeable vessel 12 made, for example, of a synthetic material, e.g. injection-molded polystyrene or stainless steel. The vessel has closed ends 14, 16. A water inlet 18 is supplied adjacent the end 16 of the vessel. A water outlet 20 is provided adjacent the end 14 of the vessel. Water-pervious material, e.g. batts 22, 24 of filaments of nylon, polyethylene, cellulosic fibers, glass fibers, etc., are packed into the vessel at both ends to define between them a space that is filled with a water-pervious (porous) batt of an ion exchange material 26 which is held in place by the batts so that the material will not escape.

The ion exchange material can be of any known type, e.g. cations, anions or mixed bed, and in any physical form such as sponges, beads, screens and cloths. If cation, the material preferably is initially charged on a sodium or hydrogen state, and if anions, on a chloride or hydroxy state.

By way of example, the following are typical commercially available ion exchange resins all of which are useful in connection with the practice of the invention: Amberlite 200, 200C, 252, IR-116, IR-120, IR-120PLUS, IR-120PD, IR-124, IRA-400, 400-C, 401-S, 402, 410, 425, 458, 900, 900-C, 904, 910, 911 and 938, sold by Rohm and Haas Co.; Dowex HCR, HGR, HCR-W, HGR-W, MPC-1, CCR-1, SBR, SBR-P, 11, SAR and WGR sold by Dow Chemical Company; and Ionac C-240, C-249, C-253, C-257, C-250, C-258, C-255, CI-295, A-260, A-300, A-302, A-540, H-544, A-546, A-548, A-550, 0l A-550, H-558, A-553, A-935, A-580 and A-590 sold by Ionac Chemical Corporation.

As thus far described, the device 10 is conventional. Water heretofore has been passed through such devices until the ion exchange material was exhausted to the point that the undesirable ions to be removed from the raw water appeared in near their original concentration at the outlet 20. Such point was heretofore determined by sundry means such as conductivity cells or flow or timing equipment which were subject to the objections heretofore mentioned.

Pursuant to the present invention, the device 10 includes an exhaustion manifesting means constituting a pair of electrodes 28, 30. The electrodes are spaced apart in the direction of flow of water through the device 10 from the inlet 18 to the outlet 20. The spacing is sufficient to interpose at least an appreciable amount of ion exchange material between them. Such spacing can be varied considerably as will be pointed out hereinafter. It is preferred to have a considerably large spacing. Excellent results are secured where substantially the entire bed of ion exchange resin 26 is located between the two electrodes. The very best results are secured, for a reason subsequently mentioned, when the downstream electrode 28 is slightly embedded in the end of the bed of ion exchange resin 26 adjacent the outlet batt 24.

As a practical matter, if it is desired to ascertain through the exhaustion manifesting means an indication of exhaustion of substantially the entire bed, the downstream electrode 28 is adjacent the downstream, i.e. discharge, end of the bed of ion exchange resin 26.

The upstream electrode 30 can be located anywhere in the device upstream of the downstream electrode 28. The maximum spacing is when the two electrodes are within their respective batts 22, 24. In the FIG. 1 form of the invention being described the upstream electrode 30 is located within the inlet end of the bed of ion exchange resin.

The configurations of the electrodes are not critical. By way of example, they may be in the form of needles, or in the form of plates such as illustrated in FIG. 1. The extent of embedment of the electrodes at opposite ends of the bed of ion exchange resin likewise is not critical. Indeed, it has already been indicated that the upstream electrode 30 can be located in the inlet batt 22, and a similar situation prevails for the downstream electrode 28 which can, if desired, be located in the outlet batt 24.

In FIG. 1 both electrodes are not located in thier respective batts but are embedded within the ion exchange material near opposite ends of the bed. The extent of embedment need not be as great as indicated in FIG. 1; preferably, the downstream electrode 28 is barely embedded in the ion exchange material at the downstream end thereof. For a reason which subsequently will be mentioned, the upstream electrode 30 is barely embedded in the upstream end of the ion exchange material in order to practice the most preferred form of the invention.

The material of which the electrodes are composed is inconsequential. Any electrically conductive material can be utilized which is inert to the resin and to the water. For example, the electrodes may be made of stainless steel, or silver, or platinum, all of which have good electrical conductivity. A high resistivity for the electrodes, e.g. carbon, is not as desirable because the voltages and currents which are to be measured with the exhaustion manifesting means are of low values and the utilization of electrodes of appreciable resistance, although within the scope of the invention, lessens the sensitivity of the exhaustion manifesting means and requires the use of more sensitive and expensive instrumentation. A preferred electrode material is silver.

Leads 32, 34 run from the electrodes 28, 30, respectively, through the respective end walls 14, 16 to the exterior of the device 10. The leads, naturally, are electrically conductive and may be insulated over their entire lengths, or are electrically conductive and simply are insulated from one another, which they will be if the end walls 14, 16 or the vessel 12 are electrically non-conductive, being made, for instance, of electrically non-conductive plastic. Insulation of the leads is preferred because it has the further advantage of protecting them from corrosion that might result from contact with the water, the material of the batts and the ion exchange resin.

The leads 32, 34 are connected by wires 36, 38 to opposite terminals of an electric signal measuring device 40 such, for instance, as a millivoltmeter or a microammeter. In order to avoid the necessity of constantly reading the device 40, a momentary normally-open switch 42 is interposed in the wire 38.

The operation of the exhaustion manifesting means constituting the electrodes and circuitry and signal measuring device associated therewith is based on the principle of electrochemical generation of an electrical signal. The vessel 12 with the ion exchange resin therein has been found to constitute a rudimentay battery the output from which is an electric signal appearing across the electrodes 28, 30. The signal read preferably is either voltage or current. Both function equally well insofar as the exhaustion manifesting means is concerned, inasmuch as the measurement taken does not represent an output of long duration, so that the rudimentary battery is not affected thereby. Essentially, the measurement is momentary, that is to say, of short duration, only being read when the momentary normally-open switch 42 is closed.

The raw water entering the inlet 18 contains various types of undesirable ions, notably calcium, magnesium and iron cations and bicarbonate anions. The treated water leaving through the outlet 20 contains less than all the undesirable ions, for example, the aforesaid cations, or the aforesaid anions, or both, are removed. The bed of ion exchange resin 26 at the beginning of the operation of the device 10 is charged with desirable ions. It has been pointed out previously that these desirable ions can basically be any one of four types. As a practical matter, one type is sodium and another is hydrogen, both of these being cations, a third is chloride and a fourth is hydroxy, both of which are anions. As water flows through the bed, desirable ions on the ion exchange resin will be exchanged for undesirable ions in the water flowing through the bed. Let it be assumed, for example, that the purpose of the bed is to soften water and that the undesirable ions in the water flowing into the bed with the influent water are, so far as softening is concerned, calcium and magnesium cations. For softening, the ion exchange material is charged with sodium cation. The undesirable cations will replace the sodium cations on the ion exchange resin. At the same time, the sodium cations on the ion exchange resin will replace the undesirable cations abstracted by the resin from the water flowing through the bed. A similar transfer, i.e. exchange, process takes place, as is well known, during decationizing (hydrogen ions in the ion exchange resin), during dealkalizing (chloride ions in the ion exchange resin), during deanionizing (hydroxy ions in the ion exchange resin, and during demineralizing (hydrogen and hydroxy ions in the mixed bed).

This ion exchange does not occur completely over successive infinitesimally thin sections of the bed in planes perpendicular to the direction of flow of water through the device 10. What does occur is that the exchange between the resin and the water of sodium cations and undesirable cations takes place, in predominant part, over a finite boundary which occupies a finite thickness of the bed in the direction of flow. The portion of the finite boundary closer to the inlet end of the bed will become exhausted before the downstream portion of the boundary becomes exhausted. Thus, the boundary over which the exchange of sodium ions (from the resin) and undesirable cations (from the water) takes place in the resin slowly moves from the inlet to the outlet end of the bed until finally the entire bed has become exhausted because all of the sodium ions on the resin have been exchanged for undesirable ions from the water. Immediately after the device in the softening example (principally calcium and magnesium) has been in use, the concentration of undesirable cations in the water at the outlet becomes markedly reduced. This concentration remains reduced at the outlet until the downstream portion of the aforesaid boundary reaches the downstream end of the bed. At this point the concentration of undesirable ions in the effluent starts to rise until when the bed is fully exhausted the concentration of undesirable ions in the effluent will be the same as the concentration of undesirable ions in the entering water.

Consider now the effect of this variation in concentration of different ions surrounding the two electrodes 28, 30. When the device 10 initiates its operation, the concentration of desirable cations in the resin is substantially the same at both electrodes. If at this time the signal measuring device is rendered effective by closure of the switch 42, the rudimentary battery will constitute the two electrodes each surrounded by a resin phase containing the same ions. Therefore, there will be no signal observable in the signal measuring device 40.

However, after the device 10 has been in operation for some time, the two electrodes will be surrounded by resin phases having different cationic constituents. The upstream electrode 30 will be surrounded by a resin phase containing all the undesirable cations because at this electrode the ion exchange resin is exhausted. But the downstream electrode will be surrounded by a resin phase containing a high concentration of the desirable cations. Hence, at this time the rudimentary battery constitutes the upstream electrode immersed in a resin phase containing the undesirable cations, while the downstream electrode is immersed in a resin phase containing the desirable cations. Under these conditions, an electric signal will be generated in the wires 36, 38 which can be read in the signal measuring device 40 if the switch 42 is closed at such time, i.e. after the water has been appreciably softened. There will be a noticeable rise in potential as observed in the signal measuring device 40.

This condition continues to exist until the exchange boundary in the bed, this being the boundary of finite width previously described, reaches the downstream electrode 28. As soon as the leading portion of the boundary in the direction of its movement reaches the electrode 28 the concentration of desirable cations in which the electrode 28 is immersed decreases, the decrease being gradual as the boundary moves downstream. At the same time, the concentration of undesirable cations starts to increase, the increase likewise being gradual. As this shifting takes place, the potential generated between the electrodes and observable on the signal measuring device 40 when the switch 42 is closed starts to lower and continues to lower until, when the bed is completely exhausted, the potential is reduced to a very low value. A residual potential has been observed to continue, it is believed because the bed never, in reality, completely exhausts except possibly over an extremely extended period of time, and no determination of this time has been taken because it is of no importance.

Reference is directed to FIG. 1a which illustrates graphically the change in voltage, current and concentration of undesirable calcium cations in the effluent from a softening (sodium ion exchange)bed. The base is time which presupposes an average level of flow of water through the device 10. The base could as well be volume of water being treated. It will be seen that as the water starts to flow through the device 10 operating on a sodium cycle, the voltage and current rise rather rapidly while the concentration of the undesirable cations, in the given case the concentration of calcium, is very low. This condition prevails for a considerable period of time depending entirely on the volume of the bed and the specific ion exchange material employed. A point is reached, however, where exhaustion of the bed starts. As just noted, this happens when the leading portion of the boundary within which exchange of ions is taking place reaches the downstream electrode 28. From this point onward the signal generated by the rudimentary battery between the electrodes 28, 30 gradually decreases as the upstream portion of the aforesaid finite boundary approaches the downstream electrode. Concurrently, the concentration of the undesirable calcium cations starts to rise and the concentration of the desirable substituted sodium cations lowers. The bed can continue to be operated until the calcium concentration has approached its original level and the electric signal, either voltage or current, becomes very low. But to allow exhaustion to proceed to such a point would be unrealistic for commercial use. Therefore, an arbitrary point is selected at which the rise of calcium concentration is such that the bed should be regenerated. This point is indicated by the reference character A in FIG. 1a. The electric signal then has reached a value indicated by the reference character B in FIG. 1a. When a reading of this value is observed on the electric signal measuring device 40 it is an indication that the bed is exhausted sufficiently to make regeneration desirable, or, if a mixed bed, substitution of a fresh mixed bed. The reading B can be a numerical voltage or current measurement on the meter or the meter can have a scale marked with two differently colored zones, the needle swinging from one to the other zone when exhaustion is considered to have taken place sufficiently far to make regeneration functionally and economically feasible.

The regeneration point is not critical. Reaching it simply means that the concentration of undesirable ions, in this case calcium cations, has started to rise to a point where the device 10 no longer is functioning as well as would be expected by a user. If the level of calcium concentration rises somewhat more, no damage will be done. Moreover, the signal only changes gradually so that it may be hours or even days before the signal has gone appreciably beyond the point where regeneration should be started. The user does not have to repeatedly close the switch 42 minute by minute or even hour by hour. Typically, once a day is ample. Indeed, after a time, a user will be able intuitively to predict when enough water has flowed through the softening device 10 for the switch 42 to be closed and the signal measuring device to be observed. If exhaustion still is not manifested, he can wait a day or even a few days more before again testing by closing the switch.

If the downstream electrode 28 is placed adjacent the discharge end of the bed, exhaustion will not be read until substantially the entire bed is exhausted. This is in contrast, for example, to placement of the downstream electrode 28, say, in the middle of the bed considered in the direction of flolw of the water. In this case the signal measuring device 40 would indicate exhaustion while a very large amount of the ion exchange resin 26 still was in substantially its initial condition so that regeneration would be unnecessary.

It will be appreciated that the same rudimentary battery is formed and the same shifting of voltages occurs near the end of exhaustion with any kind of ion exchange resin. A cation exchange resin on the sodium cycle has been mentioned only by way of example. The invention will function with equal utility with a cation exchange resin on the hydrogen cycle, an ion exchange resin on the chloride cycle, an ion exchange resin on the hydroxy cycle and a mixed bed on the hydrogen/hydroxy cycles. The device obviously will work equally well with all of the ion exchange materials of different types and sold by different manufacturers. The principle of operation is not thereby altered.

Figure 2:
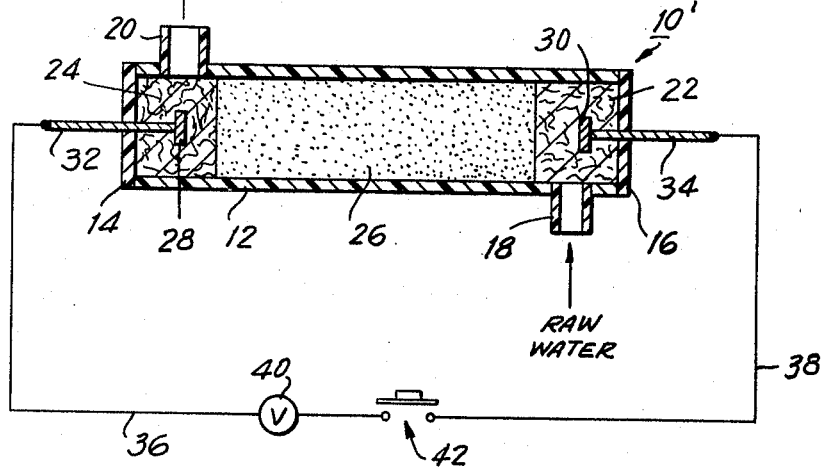

FIGS. 2 through 4 illustrate different placements of the upstream and downstream electrodes. The same reference numerals have been applied to the same parts of the different devices 10' of FIG. 2, 10" of FIG. 3 and 10''' of FIG. 4.

In FIG. 2 both electrodes 28, 30 have been placed in their respective water-pervious retaining walls, to wit, the batts 24, 22.

As soon as ion exchange develops in the bed of material 26, the downstream electrode will be immersed in water containing a very low undesirable of undesirabled ions and a considerable concentration of desirable ions that were substituted for undesirable ions removed by the material 26. However, the upstream electrode still is immersed in water containing the original undesirable ions. Therefore, a signal is developed across the electrodes which will be manifested in the signal measuring device when the switch 42 is closed.

When the downstream portions of the ion exchange boundary reaches the downstream end of the material 26, the concentration of undesirable ions in the water around the downstream electrode rises and the concentration of desirable ions falls. The concentrations of the undesirable ions around the upstream electrode 30 do not change. Consequently, the signal manifested in the signal measuring device 40 when the switch is closed falls. Thus, the device 10' operates in the same manner as the device 10.

In a like manner the device 10" shown in FIG. 3 operates in the same manner as the device 10, said device 10" having the downstream electrode 28 in the water-pervious retaining wall 24 and the upstream electrode 30 embedded in the upstream portion of the material 26. Hence, here likewise there will be a change in signal value when the downstream portion of the ion exchange boundary reaches the downstream end of the ion exchange material 26.

A similar result obtains if the downstream electrode 28 is embedded in the downstream end of the material 26 and the upstream electrode is embedded in the water-pervious retaining wall 22. This embodiment has not been illustrated.

FIG. 4 shows a device 10''' similar to the device 10'' except that the upstream electrode 30 has been moved downstream to near the downstream end of the material 26. The operation of this device is similar to that of the device 10'' in that when the downstream portion of the ion exchange boundary reaches the downstream end of the material 26 there will be a change in signal observable on the signal measuring device 40 when the switch 42 is closed.

It should be observed that the change in signal is not always such that the signal decreases as the system approaches exhaustion. For instance, in some systems the reverse takes place, i.e. an increase as exhaustion is approached. All systems, nevertheless, experience a change in signal as exhaustion is approached, that is to say, a substantial and easily observable change from a value of signal that prevailed for a considerable time prior to the approach to exhaustion.

An especially good application of this aforesaid exhaustion manifesting means is shown in FIG. 5 wherein said means is incorporated in a device 44 that is designed to be used with a single water faucet in a home. Heretofore, the only water treatment devices for single faucets in the home have been filters which physically trapped objectionable substances in water, e.g. particles or odors. Equipment for removing solubles, i.e. ions, has not lent itself to employment with single faucets because of complexity, size and cost of auxiliary equipment for regeneration and for determining approach to exhaustion of the ion exchange material. The device 44 overcomes these difficulties, largely through utilization of the new exhaustion manifesting means.

Said device 44 constitutes a hollow horizontally elongated vessel 46 of square, oblong or round cross-section. Walls 49, 50 close the ends of the vessel. A water-pervious bed 52 of an ion exchange material initially charged with sodium ions is disposed in the vessel between water-pervious retainers 54, 56 constituting, for example, glass fiber batts. The batts and bed are held in position by an imperforate wall 58 at the downstream end of the bed 52 and by a perforate wall 60 at the upstream end of the bed. The vessel 46 and walls 48, 50, 58 and 60 desirably, for lightness and low cost, are fabricated from a synthetic plastic, e.g. high-impact polymer of butadiene and styrene.

A baffle 62 is located in the vessel 46 upstream and spaced from the perforate wall 60. The baffle terminates short of the upper side of the vessel 46 to provide a flow-through gap 64. The purpose of the baffle is to insure that the bed 52 is substantially flooded with water being treated during the operation of the device 44.

A chamber 66 is located between the baffle 62 and the upstream end wall 50. This chamber serves several functions.

At the bottom of the chamber a water inlet 68 is formed. This inlet has detachably secured to it an inlet hose 70 the other end of which terminates in a coupling 72 of a well-known type which is adapted to be removably attached to the spout of a water faucet 74. An externally threaded sleeve 76 extends upwardly from the top of the chamber 66.

One purpose of the chamber 66 is to perform filtering. For this, a hollow cartridge 78 is disposed in the chamber, the upper end of the cartridge extending into the sleeve 76. The lower end of the cartridge desirably includes an annular downwardly extending flange 80 seated in a matching annular recess formed in the inner surface of the bottom wall of the vessel 46 so as to prevent the cartridge from shifting laterally. The cartridge is formed from fibrous material bonded with a synthetic resin, e.g. phenolic resins, epoxies, etc. Due to its arrangement as just described, water entering the vessel must flow through the cartridge which is porous. During its passage, the cartridge will block particulate materials before they reach the bed 52. If the water supply requires it, the interior of the cartridge can be filled with activated carbon to remove odor and/or unpleasant taste. A cap 82 is screwed onto the sleeve 76. The cap holds the cartridge down and also provides access to the chamber 66 when a regenerating material is to be introduced.

An outlet 84 for treated water is provided at the top of the vessel over the downstream porous retainer 54. A discharge hose 86 is secured to the outlet and leads water to a sink 88 associated with the faucet 74. For convenience of illustration, the sink 88 has been displaced from the faucet in FIG. 5 but, in actual practice, the sink 88 preferably will be directly below the faucet and the device 44 will be disposed above the sink to one side of the faucet and on the rear wall of the room in which the sink is located. The device thus will be in an out-of-the-way position and yet readily convenient for use when water from the faucet 74 is to be treated, merely requiring attachment of the coupling 72 to the faucet.

The front wall of the vessel 46 supports a signal measuring device 90 from which a lead 92 runs to a momentary normally-open switch 94. The actuating button for the switch is located on the front wall of the vessel 46. A lead 96 runs from the switch 94 to a downstream electrode 98. A lead 100 runs from the device 90 to an upstream electrode 102. The downstream electrode is disposed in the bed 52 near the downstream end of said bed. The upstream electrode is disposed in the bed 52 near the upstream end of said bed. Thus, the two electrodes are spaced apart substantially for reasons previously mentioned. The bed 52 is composed of a porous mass of a cation exchange resin operating on an $Na^+$ cycle.

In the operation of the device 44 water leaving the faucet first will flow into the chamber 66 passing, as it does so, through the cartridge 78 so that the water flowing over the top of the baffle 62 will be free of particulate matter and, if activated carbon also is used, substantially odorless and taste-free as well. The water then flows downstream to the perforate wall 60 to enter the retainer 56 and then the bed 52. The retainer 56 has no effect on the water inasmuch as any particulate matter will have been trapped earlier in the chamber 66. However, the bed 52 serves to soften the water flowing through it by removing the calcium and magnesium cations and substituting for them sodium cations from the resin. The calcium and magnesium cations, in turn, become attached to the resin. The resin also will exchange sodium ions for other undesirable ions that may be present in the water, for example, iron ions.

Thus, the water exiting through the discharge hose 86 will have had removed from it not only odors, taste and particulate matter, as is commonly accomplished with cartridges adapted to be attached to individual faucets, but further will have had removed from it undesirable cations of water-soluble salts which heretofore have only been removed from household water by ion exchange systems which were rather elaborate, large and expensive and which treated all the water used in a house.

The device 44 of the present invention is particularly well adapted to be used with single faucets at sites where softened water is most desirable such, for instance, as at dishwashers, clothes washers, lavatory sinks where one's hands and hair will be washed, and kitchen sinks. In each of these locations hard water which contains calcium and magnesium salts renders the use of the water difficult because of the reactions with soap and the formation of curds. Obviously, the substitution of sodium ions for the hard water cations prevents this and yet enables a rather inexpensive device to be used because all of the water in the house does not have to be treated such, for instance, as the water for showering, baths and toilets. Moreover, the water softener will eliminate soluble iron salts from the water which under certain conditions will stain clothes and appliances.

When the bed 52 approaches exhaustion, as will be apparent from a decrease in signal observed on the device 90 when the switch 94 is momentarily closed, the faucet 74 is turned off, the cap 82 is unscrewed and removed, the cartridge 78 is abstracted from the chamber 66, the hose 70 is detached from the faucet 74, the chamber 66 is drained, the hose is reconnected to the faucet, common salt is poured into the chamber, the cap 82 is replaced and the faucet is reopened to allow flow of water at a rate, referably less than that which is used during a softening operation, e.g. about one-half this rate. In a typical device 44 about one hour suffices for regeneration. This includes about one-quarter of an hour for flushing.

It thus will be seen that there are provided an apparatus and method which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. An apparatus for detecting the exhaustion point of a porous mass of ion exchange material originally charged with desirable ions selected from the group consisting of desirable cations and desirable anions, said apparatus comprising:
   A. a container having an inlet boundary and an outlet boundary spaced from one another,
   B. a porous mass of ion exchange material in the container between said boundaries, the whole mass originally being substantially uniformly charged with selected desirable ions from the aforesaid group consisting of desirable cations and desirable anions,
   C. an inlet for directing liquid to be treated by said material to the inlet boundary,
   D. an outlet through which liquid flows after treatment by said material and after leaving the outlet boundary,
   E. means providing a continuous flow path for said liquid between said inlet boundary and said outlet boundary, said path traversing at least a substantial portion of said mass,
   F. means mounting a downstream electrode in electrical contact with said flow path,
   G. means mounting an upstream electrode spaced from the downstream electrode in the direction of flow of the liquid, said upstream electrode being in electrical contact with said flow path,
   H. means electrically insulating said mounting means from one another,
   I. at least a substantial portion of said material being disposed between said electrodes,
   J. said material progressively changing its ionic state from its original state of charge with selected desirable ions to a final state as the liquid flows therethrough and an ion transfer takes place between the liquid and the material by which undesirable ions in the liquid are exchanged for charged desirable ions on the material so that the material in its final state is charged with undesirable ions and the liquid leaving the bed before the material reaches its final state contains desirable ions substituted for undesirable ions,
   K. said mass between said electrodes in the presence of said liquid constituting a battery wholly disposed within the apparatus,
   L. an electric potential of one value being generated solely by said battery between the electrodes when the liquid in the upstream portion of the material is in an ionic state differing from the ionic state of the liquid in the downstream portion of the material, while the downstream portion of the material still is in its original state,
   M. an electric potential of a different value being generated solely by said battery between the electrodes when the downstream portion of the material approaches its final state, and
   N. electrical means for indicating the potential between the electrodes so that a change in potential denotes substantial exhaustion of the material and the need for regeneration or replacement thereof.

2. An apparatus as set forth in claim 1 wherein the electrical means is a meter.

3. An apparatus as set forth in claim 1 wherein the electrical means is a volt meter.

4. An apparatus as set forth in claim 1 wherein the electrical means is a millivoltmeter.

5. An apparatus as set forth in claim 1 wherein the electrical means is an ammeter.

6. An apparatus as set forth in claim 1 wherein the electrical means is a microammeter.

7. An apparatus as set forth in claim 1 wherein the material is a cation exchange material.

8. An apparatus as set forth in claim 7 wherein the material is initially charged on an $Na^+$ cycle.

9. An apparatus as set forth in claim 7 wherein the material is initially charged on an $H^+$ cycle.

10. An apparatus as set forth in claim 1 wherein the material is an anion exchange material.

11. An apparatus as set forth in claim 10 wherein the material is initially charged on a Cl⁻ cycle.

12. An apparatus as set forth in claim 10 wherein the material is initially charged on an OH⁻ cycle.

13. An apparatus as set forth in claim 1 wherein the material includes both cationic and anionic exchange materials.

14. An apparatus as set forth in claim 13 wherein the cationic and anionic materials are initially charged on H⁺ and OH⁻ cycles, respectively.

15. An apparatus as set forth in claim 1 wherein the downstream electrode is adjacent the downstream portion of the material.

16. An apparatus as set forth in claim 1 wherein the downstream electrode is embedded in the downstream portion of the material.

17. An apparatus as set forth in claim 15 wherein the downstream electrode is beyond the downstream portion of the material so as to be disposed in the treated liquid leaving the material.

18. An apparatus as set forth in claim 1 wherein a porous mass of inert material is abutted against the downstream portion of the ion exchange material and wherein the downstream electrode is embedded in the inert material.

19. An apparatus as set forth in claim 15 wherein the upstream electrode is adjacent the upstream portion of the material.

20. An apparatus as set forth in claim 19 wherein the upstream electrode is embedded in the upstream portion of the material.

21. An apparatus as set forth in claim 19 wherein the upstream electrode is upstream of the upstream portion of the material so as to be disposed in the untreated liquid before such liquid reaches the material.

22. An apparatus as set forth in claim 19 wherein a porous mass of inert material is abutted against the upstream portion of the ion exchange material and wherein the upstream electrode is embedded in the inert material.

23. An apparatus as set forth in claim 1 wherein the material is initially charged on an Na⁺ cycle and wherein means is included to connect the inlet to a domestic water outlet.

24. An apparatus as set forth in claim 23 wherein the domestic water outlet is a faucet.

25. An apparatus as set forth in claim 24 wherein filter means is interposed between the inlet and the upstream portion of the ion exchange material.

26. An apparatus as set forth in claim 25 wherein the filter means includes fibrous material.

27. An apparatus as set forth in claim 25 wherein the filter means includes a mass of activated charcoal.

28. An apparatus as set forth in claim 25 wherein the filter means includes fibrous material and activated charcoal.

29. An apparatus as set forth in claim 23 wherein the device includes a chamber between the inlet and the upstream portion of the ion exchange material, said chamber having removable entry means for insertion of filter means or regenerating material.

30. An apparatus as set forth in claim 24 wherein the container is elongated and wherein the longitudinal axis thereof is horizontal.

31. An apparatus as set forth in claim 30 wherein the container is mounted on a wall next to the faucet and in back of the sink.

32. A method for detecting the exhaustion point of a porous mass of ion exchange material extending in a container from an inlet boundary to an outlet boundary and originally wholly being substantially uniformly charged to an original state with desirable ions selected from the group consisting of desirable cations and desirable anions, said method comprising:

A. flowing a liquid to be treated and containing undesirable ions through the mass between the boundaries so as to progressively change the ionic state thereof to a final ionic state while exchanging desirable ions on the material for undesirable ions in the liquid, B. providing electrodes spaced from one another in the direction of flow of the liquid and with at least a portion of said material therebetween so that said mass between said electrodes in the presence of said liquid constitutes a battery wholly disposed within the container, C. an electric potential of one value being generated solely by said battery between the electrodes when the liquid in the upstream portion of the material is in an ionic state differing from the ionic state of the liquid in the downstream portion of the material while the downstream portion of the material still is in its original state, D. an electric potential of a different value being generated solely by said battery between the electrodes when the downstream portion of the material approaches its final state, and E. observing the electrical values of said potentials and by determining when the potential of different value is generated that the material is substantially exhausted so as to need regeneration or replacement thereof.

* * * * *